United States Patent [19]

Anderson et al.

[11] 4,240,676
[45] Dec. 23, 1980

[54] BENDING PAD THRUST BEARING

[75] Inventors: Hugh G. Anderson, Severna Park; Earl R. Quandt, Annapolis; A. Bayne Neild, Severna Park, all of Md.

[73] Assignee: The United States of America as represented by the Secretary of the Navy, Washington, D.C.

[21] Appl. No.: 69,191

[22] Filed: Aug. 24, 1979

[51] Int. Cl.³ .............................................. F16C 17/04
[52] U.S. Cl. .................................... 308/9; 308/160; 308/170; 308/26
[58] Field of Search ................... 308/9, 160, 170, 156, 308/168, 172, 169, 143, 26

[56] References Cited

U.S. PATENT DOCUMENTS

| 3,814,487 | 6/1974 | Gardner | 308/160 |
|---|---|---|---|
| 3,930,691 | 1/1976 | Greene | 308/9 |
| 3,966,279 | 6/1976 | Raimondi | 308/160 |
| 3,993,371 | 11/1976 | Orndorff | 308/121 |

Primary Examiner—Lenard A. Footland
Attorney, Agent, or Firm—R. S. Sciascia; L. A. Marsh

[57] ABSTRACT

A "fixed" pad element of a thrust bearing having a plurality of such pads with each pad including at least one groove formed in the sidewalls of the leading and trailing edge portions of the bearing pad to cause the edge portions to be more deformable than the intermediate portion. Such edge portion may also have a lower resultant coefficient of thermal expansion than the intermediate portion such that the pad surface, when hydrodynamically and thermally loaded, assumes a convex surface profile to define a wedge shaped hydrodynamic lubricating film between the pad and the adjacent thrust member. Additional lubrication may be provided through a central lubrication passage connected to a pressurized oil supply. In an embodiment where there is a plurality of sidewall grooves, some of the grooves may have different depth and width dimensions and such plurality of grooves may be filled with materials having a lower coefficient of thermal expansion, greater deformability and/or greater compressibility than the material forming the body of the pad. In another embodiment, the bearing pad may be a composite laminated structure which includes one or more layers of materials having a lower coefficient of thermal expansion, greater deformability and/or greater compressibility than the body material wherein a greater thickness of such layer occurs adjacent the edge portions of the pad. When partially or substantially unfilled, such grooves may serve as cooling surfaces allowing additional cooling of the bearing pad.

15 Claims, 7 Drawing Figures

BENDING PAD THRUST BEARING

The invention described herein may be manufactured and used by or for the Government of the United States of America for governmental purposes without the payment of any royalties thereon or therefor.

BACKGROUND OF THE INVENTION

The present invention relates to thrust bearings, and more particularly, to uniformly supported, fixed thrust pads for such bearings, which pads have controlled lubrication and groove means for allowing the bearing surfaces to assume friction reducing configurations.

Basically, a thrust bearing is a device adapted to hydraulically transmit axial thrust loads imposed on a shaft to an adjacent stationary support structure. A thrust bearing assembly generally comprises a propulsion shaft having a radial thrust flange secured thereto; a housing enclosing and supporting the shaft with a stationary housing member axially spaced from the thrust flange; and a plurality of thrust pads disposed between the rotating thrust flange and the stationary housing member for transmitting thrust loads therebetween. It is desirable to maintain a hydrodynamic lubricant film between the rotating thrust flange and the bearing surface of the thrust pads to allow the thrust flange to rotate freely, in spaced relationship, over the bearing surface and effectively transmit thrust loads thereto through the lubricating film.

Accordingly, a factor governing effective performance of a thrust bearing assembly and efficient transmission of thrust loads to the thrust pads is the maintenance of the hydrodynamic lubricating film at all operating pressures and temperatures. Recognizing that the thickness of such films are on the order of thousandths and ten-thousandths of an inch, bearing surfaces should be constructed to minimize surface variations under operating conditions so that the bearing surfaces are always separated by a very thin lubricating film. However, the geometry of thrust pad bearing surfaces is appreciably affected by the hydrodynamic lubricant film pressure and differential thermal gradients. For example, the combination of the compressive stress due to the oil pressure in the hydrodynamic lubricant film and the thermal stresses due to differential heating of the bearing surfaces may cause surface contact and failure of the bearing pad, especially near the central portion thereof where temperature and thrust stress conditions are normally the most severe.

Various thrust pad arrangements have been proposed for accommodating the compressive, bending moment and thermal stresses acting on the bearing pads. For example, "pivoted" pad type bearings, as exemplified by U.S. Pat. Nos. 3,423,139; 3,764,187; 3,784,266 and 4,103,979, generally include tiltable segments which are pivotally disposed on rigid support members, such as steel buttons and ribs mounted on the supporting thrust member. Generally, such pivoted pad members are intended by design to tilt on the pivot supports so that a wedge-shaped lubricating film is formed between the rotating thrust member and the thrust pad wherein the film wedge decreases in thickness in the direction of rotation of the thrust member. Although the pivot supports have been offset from the midpoint of the bearing pad to effect efficient tilting thereof, such an arrangement generally has the disadvantage of limiting the shaft to one direction of rotation. Also, although the bearing pads have been made thicker and more complex in construction to strengthen the pad against bearing failure at the pivot point and to cause the bearing surface to assume a particular surface configuration under loading conditions, the very complexity and relative thickness of the bearing pads may cause unpredictable thermal distortions of the bearing surface and localized failure of the bearing pads. Further, the pivotal nature of the bearing pad makes it difficult to construct a central oil passage for maintaining an oil supply to the central portion of the bearing pad.

Other types of bearing pad arrangements include those exemplified by U.S. Pat. Nos. 3,761,151 and 3,966,279, wherein the bearing pads are hydraulically supported, and U.S. Pat. No. 3,930,691 which relates to a "swing" pad bearing.

SUMMARY OF THE INVENTION

Accordingly, this invention provides a thrust bearing assembly designed to overcome problems in the prior art and generally includes a shaft flange rotating relative to a stationary housing structure and a plurality of fixed bearing pads disposed therebetween and attached to one of the members. Each thrust pad bearing element includes a planar base portion uniformly and continuously supported on a stationary support structure so that concentrated loading patterns, such as occurs with the pivot pad supports, are eliminated. The bearing face of the thrust pads, which is normally parallel with the base in unstressed conditions, is thermoelastically and hydrodynamically deformable to assume a crowned or convex bearing face under operating conditions to allow formation of a wedge shaped hydrodynamic lubrication film between the leading edge and intermediate bearing portions and an adjacent thrust member.

Grooves formed in the sidewalls of the leading and trailing edge portions of the bearing pad not only cause the edge portions to be more compressible than the intermediate portion of the bearing pad but also provide cooling surfaces which allow cooling of the intermediate portions of the bearing pad. Preferably, the grooves extend across the sidewalls wherein the oil pressure generated by the hydrodynamic oil film causes greater deflection of the edge portions than the intermediate portion. According to one embodiment, the grooves extend at varying depths in the edge portions of the bearing pad wherein one or more of the grooves are selectively filled with one or more of materials having characteristics of a lower coefficient of thermal expansion, greater deformability and greater compressibility than the material forming the body of the bearing pad or any combination of these properties. Such grooves may have different shapes to accommodate a particular load or stress pattern. In a second embodiment, the bearing pad is a composite laminate structure which includes one or more layers of the aforementioned kind of filler material wherein the greatest thickness of the layer occurs adjacent the bearing pad edge portions.

Thus, the construction of the bearing pad is such that the leading and trailing edge portions may have smaller resultant coefficients of thermal expansion, deformation and compressability taken singularly or in combination than the intermediate portion. Hence, for example, with increasing operating temperatures caused by increased thrust loads and higher rotational speeds, the intermediate bearing pad portion increases in thickness at a faster rate than the edge portions, allowing the bearing face to assume a convex profile.

Lubricating conduits extend through intermediate portions of the bearing pads for supplying pressurized lubricant to the hydrodynamic lubricating film.

Accordingly, a general object of this invention is to provide a bearing assembly which is easily and inexpensively manufactured and has a high load capacity.

Another object of the invention is the provision of a "fixed" thrust pad bearing which utilizes a hydrodynamic fluid film layer between the bearing surface of the thrust pad and a thrust member moving thereover.

A further object of the present invention is to provide a bearing pad having a bearing surface capable of assuming a predetermined convex configuration under load such that a wedge shaped hydrodynamic fluid film is formed and maintained between the leading and intermediate bearing pad portions and the moving thrust member.

BRIEF DESCRIPTION OF THE DRAWINGS

The novel features which are believed to be characteristic of this invention are set forth with particularly in the appended claims. The invention itself, however, both as to its organization and method of operation, together with further objects and advantages thereof, may best be understood by reference to the following description taken in connection with the accompanying drawings, in which:

DETAILED DESCRIPTION OF THE PREFERRED EMBODIMENTS

Figure 1:
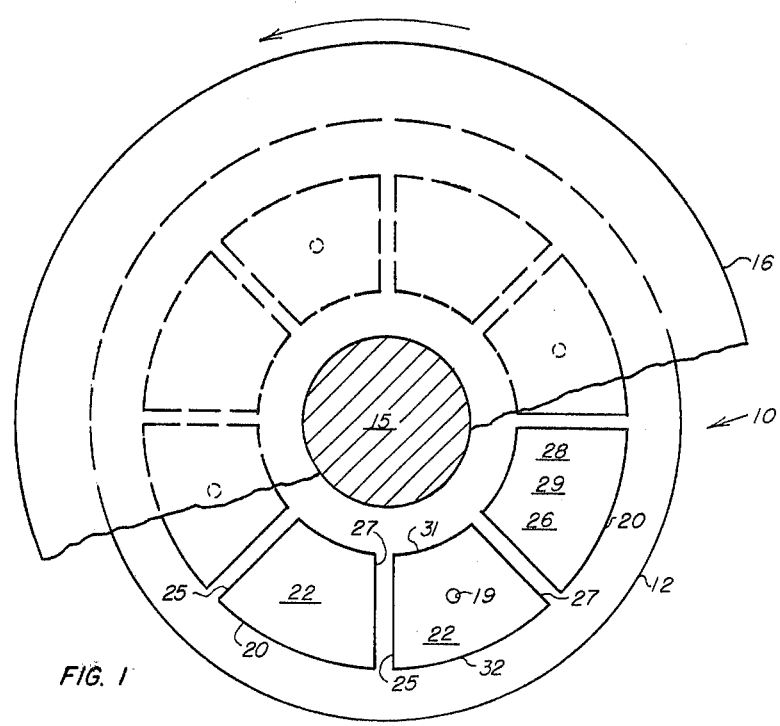
FIG. 1 is a partial plan view of a centrally supported, segmental thrust bearing constructed according to the invention.

Referring now to the drawings, wherein like reference characters designate like or corresponding parts throughout the several views, FIG. 1 shows a partial top plan view of a thrust bearing assembly 10, generally including a plurality of circumferentially spaced segmental thrust bearing pads 20, uniformly supported by and attached to a stationary thrust member 12. A rotatable thrust member 16, which is coupled to a rotatable shaft 15 and shown partially broken away in FIG. 1, is spaced from the stationary thrust member 12 and designed to rotate on a thin hydrodynamic lubricant film over adjacent bearing surfaces 22 of the individual bearing pads 20. Such bearing structure 10 is usually mounted within the housing of a propulsion system wherein the stationary thrust member 12 is integrally formed or otherwise attached to the housing and the shaft 15 and thrust member 16 are rotationally supported therein. In FIG. 1, eight bearing pads 20 are circumferentially disposed around the shaft wherein the radial dimension of each pad 20 is generally equivalent to the circumferential dimension.

Figure 2:
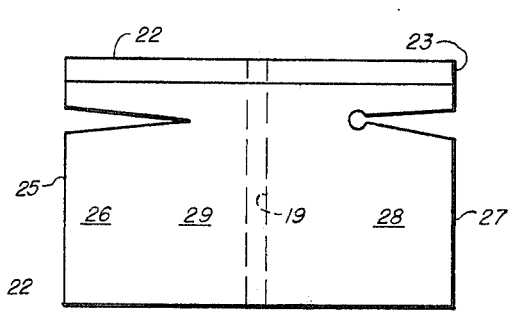
FIG. 2 is a side view of a fixed thrust bearing pad according to one embodiment of the invention.
Figure 6:
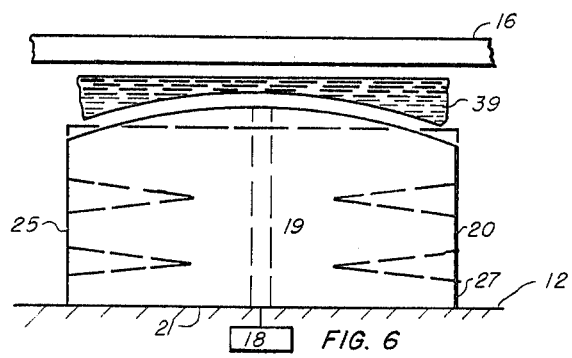
FIG. 6 is a general operational view of a thrust bearing pad according to the first embodiment of the invention.
Figure 7:
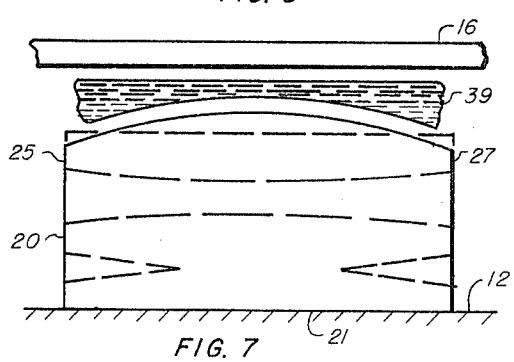
FIG. 7 is a general operational view of a thrust bearing pad according to a second embodiment of the invention.

In the preferred embodiments, each thrust bearing pad 20 includes a base portion 21 as shown in FIG. 2, adapted for uniform support by the stationary thrust member 12 so that loads applied to the bearing pad 20 are uniformly distributed to the stationary thrust member 12, thus avoiding localized bearing problems commonly associated with pivot or point bearing supports. Each bearing pad 20 further includes a lubricated bearing surface 22 disposed in sliding relationship with the rotating flange or thrust member 16 such that thrust loads are effectively transmitted therebetween. The hydrodynamic oil film formed between the bearing surface 22 and the rotating thrust flange 16 generates an oil pressure of sufficient magnitude that metal to metal contact of the adjacent bearing members 16, 20 is prevented while thrust pressures are transmitted to the bearing pad 20. However, the heat and oil pressures generated in the hydrodynamic oil film, which is generally on the order of thousandths and ten-thousandths of an inch in thickness, cause distortion and differential deformation of the bearing surface 22. Thus, while the bearing face 22, which may contain a thin layer of babbit metal 23, is substantially planar and parallel to the base portion 21 in the unstressed condition represented by FIGS. 2–5, the bearing surface 22 is capable of thermoelastic and compressive deformations under load to assume a crowned or curved bearing face, as represented in FIGS. 6 and 7.

Control of the deformation and distortion of the bearing surface 22 in the first embodiment is generally accomplished by groove means provided in the sidewalls of the bearing pad 20. Such groove means are formed in the leading and trailing sidewalls 25, 27 of the bearing pad 20, wherein such sidewalls are oriented in radial planes that are transverse to the direction of rotation of the thrust flange 16. The sidewalls 25, 27 extend in a vertical direction from the base 21 to the bearing surface 22 and in a radial direction from an inner arcuate sidewall 31 to an outer arcuate sidewall 32. Leading and trailing bearing pad edge portions 26, 28 are defined as being respectively adjacent the leading sidewall 25 and trailing sidewall 27 and an intermediate bearing pad portion 29 is defined between the edge portions 26, 28. The grooves constituting the aforementioned groove means formed in the leading edge portion 26, and preferably, also the trailing edge portion 28, extend generally across the sidewalls from the inner arcuate sidewall 31 toward the outer arcuate sidewall 32.

The grooves formed in the leading and trailing sidewalls 25, 27, cause the leading and trailing bearing edge portions 26, 28 to have different resultant coefficients of temperature expansion than the intermediate portion 29 such that with increasing temperature, the intermediate portion 29 increases in thickness at a faster rate than the leading and trailing edge portions 26, 28 thereby allowing the bearing face 22 to assume a predetermined profile. Additionally, the grooves cause the bearing surface 22 to have zones of maximum compressibility and deformability adjacent the leading and trailing sidewalls 25, 27 with the stiffness of the leading and trailing edge portions 26, 28 increasing toward the intermediate portion 29 whereby oil pressures resulting from movement of the thrust flange 16 through a lubricant and over the bearing face 22 causes a greater deflection of such edge portions than of the intermediate portion 29. To allow the bearing face 22 to assume a predetermined configuration for a specific thrust loading, it is recognized that the shape, depth and width of an individual groove may vary as well as the relative spacing and orientation of a plurality of grooves in a given sidewall. For example, although the grooves commonly decrease in vertical width from a sidewall toward the intermediate portion 29, the depth of such groove in the sidewall may vary from the inner arcuate sidewall 31 toward the outer arcuate sidewall 32 to allow a more balanced load distribution on the somewhat pie-shaped bearing surface 22. Additionally, the exposed surfaces of the grooves provide a means for differentially cooling the edge and intermediate portions of the bearing pad 20.

Figure 3:
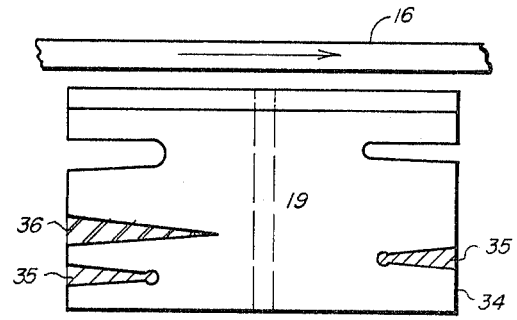
FIG. 3 is a side view of a thrust bearing pad consistent with the first embodiment of the invention but showing a slightly different structure than FIG. 2.
Figure 4:
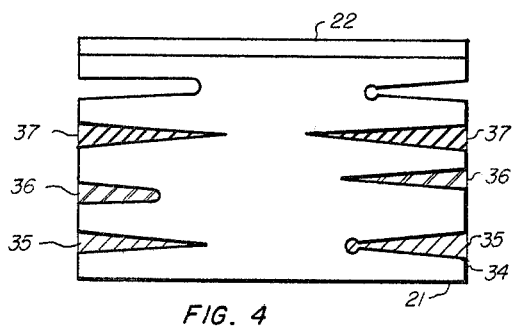
FIG. 4 is a side view of a thrust bearing pad constructed according to the first embodiment of the invention but being of slightly different structure than FIGS. 2 and 3.
Figure 5:
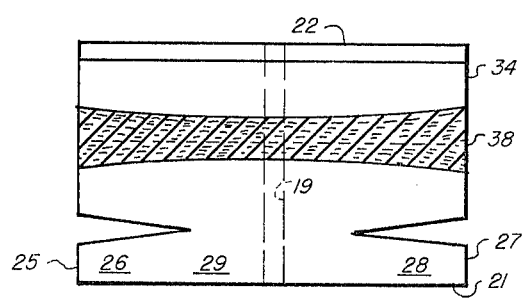
FIG. 5 is a side view of a thrust bearing pad constructed according to a second embodiment of the invention.

As shown in FIGS. 2-4, relating the first embodiment of the invention, the grooves may be filled with materials having different coefficients of thermal expansion, deformability and/or compressibility than the material 34 forming the body of the bearing pad 20 to more precisely control the deformation of the bearing surface 22. For example, FIG. 2 illustrates a bearing pad structure having a groove formed in the leading and trailing sidewalls 25, 27. The bearing pad structure of FIG. 3 shows three grooves formed in the leading sidewall 25 and two grooves formed in the trailing sidewall 27 wherein such grooves penetrate the sidewall edge portions at varying depths. As further illustrated by FIG. 3, some of the grooves can be filled with materials having different characteristics, such as material 35 which has a lower coefficient of thermal expansion than the body material 34 and material 36 which has a greater deformability than the body material. The structure of FIG. 3 may be particularly applicable for unidirectional bearing pad structures wherein a shaft flange 16 is designed to move over the bearing surface 22 in one direction only, as represented by the directional arrow. FIG. 4 is representative of a bearing pad structure which includes a plurality of grooves formed in the leading and trailing sidewalls 25, 27 wherein some of the grooves may be filled with materials 35 and 36 of the aforementioned characteristics as well as material 37, which has a greater compressibility than the body material 34. As further shown in FIGS. 2 and 3, the particular size and shape of the grooves can vary, as for example, the V-shaped grooves of FIG. 2, the U-shaped grooves of FIG. 3 and the rounded fillet construction in FIG. 3. Obviously, other groove shapes not specifically shown, such as those with rectangular and arcuate characteristics as well as drilled holes, for example, are within the scope of this invention. Recognizing that FIGS. 2-4 are merely illustrative of specific bearing pads, it is apparent that there are large number of combinations of different materials which can be interposed in various grooves having different shapes and sizes to achieve a predetermined deformation of the bearing surface 22 for a particular design load.

With respect to the embodiment of the invention illustrated by FIGS. 2-4, rotation of the shaft 15 and thrust flange 16 in the direction indicated by the arrow in FIG. 1 will, as a consequence of the shearing force generated thereby, produce a hydrodynamic layer 39 of lubricating fluid between the bearing surface 22 and the adjacent thrust flange 16, as shown in FIG. 6. Further, the oil pressure distribution generated within the hydrodynamic film 39 by the thrust loads is generally parabolic with the compressive stress reaching a maximum at the center of the bearing face 22 and decreasing to a minimum value at the edge portions thereof. Such a compressive pressure distribution when acting on a uniformly compressible surface would tend to bend the pad ab out the central portion as well as compress the central portion differently than the edge portions. The combination of the pressure force with the component of the hydrodynamic shear force of the lubricant produces a force which causes deformation of the leading edge portion to produce the desired configuration of the pad bearing surface 22. Under such loading pattern there is a tendency for the grooves to close up. The deformability feature of the pad prevents the resulting tilting moment on the pad from closing the lubricating wedge. Further, thermal gradients are generated in the bearing face 22 such that the central portion, which tends to be hotter than the edge portions, undergoes greater thermal distortions and, hence, greater expansion than the edge portions. With the present structure, the relative deformability of the upper regions of the bearing pad 20 allows a compressive bending of the upper regions of the bearing pad 20 about the intermediate portion 29 wherein the edge portions are compressed and deflected more than the intermediate portion 29. Thermoelastic deformations of the bearing face 22, wherein the intermediate portion 29 increases in thickness at a rate faster than the edge portions 26, 28, is generally compatible with the compressive deformations such that localized stress concentrations are eliminated. Thus, by matching the aforementioned properties of the filler materials and the body material 34 as well as modifying the configuration and shape of some of the grooves, a bearing pad capable of assuming a predetermined configuration for various bending moments and shear, compression and thermal stresses can be constructed. Oil supply means 18 connected to oil conduit 19 of known construction, as generally shown in the various figures, may be provided to maintain a predetermined oil pressure and thickness of the hydrodynamic film.

In the second embodiment of the invention, the bearing pad 20 comprises a laminated structure which includes one or more layers of materials having one or more of the following characteristics: a lower coefficient of thermal expansion and/or greater deformability and/or greater compressibility than the body material. Merely illustrative and not limited thereto, FIGS. 5 and 7 generally depict a contoured layer of material 38 having one or more of the aforementioned properties disposed between the conforming surfaces of the base portion 21 and the bearing surface 22 such that the leading and trailing edge portions 26, 28 are more deformable than the intermediate portion 29. The intermediate portion 29 has a different resultant coefficient of thermal expansion than the leading and trailing edge portions 26, 28 such that with increasing operating temperatures the intermediate portion 29 increases in thickness at a faster rate than the leading and trailing edge portions 26, 28 allowing formation of a wedge shaped hydrodynamic lubricating film between the bearing surface 22 and the rotating thrust member 16. Preferably, the layer material 38 decreases in thickness at the intermediate portion 29 such that tendency of the base portion 21, layer material 38 and bearing surface 22 to slide relative to each other due to applied shear forces is reduced. If formed of a relatively compressible material, stiffening materials may be added to layer material 38 to increase the lateral stiffness of such layer and to diminish bulging of the layer at the sidewalls. In operation, the second embodiment behaves much like the first embodiment and lubricating means in the form of oil supply means 18 and oil supply conduit 19 may also be provided therein.

Obviously many modifications and variations of the present invention are possible in light of the above teachings. It is therefore to be understood that within the scope of the following claims the invention may be practiced otherwise than as specifically described.

What is claimed is:

1. A thrust bearing pad for transmitting thrust loads between a rotary thrust member and a stationary thrust member, said bearing pad being rigidly attached to one of said members and comprising:
   a planar base portion including means uniformly supporting said bearing pad on a member; and
   a bearing face in sliding engagement with the opposite thrust member for transmitting power to said opposite thrust member while moving relative thereto, said bearing face being substantially planar and parallel to said base portion in the unstressed condition and being thermoelastically deformable in operation to assume a crowned bearing face when thrust loads are applied thereto.

2. The bearing pad according to claim 1 wherein:
   said bearing pad includes spaced leading and trailing sidewalls extending from said base portion to said bearing face and defining leading and trailing edge portions of said pad with an intermediate portion lying between the leading and trailing edge portions; and
   said sidewalls having a plurality of grooves formed therein extending generally parallel to said base, said leading and trailing bearing edge portions having a different resultant coefficient of temperature expansion than said intermediate portion such that with increasing temperature said intermediate portion increases in thickness at a faster rate than said leading and trailing edge portions, allowing said bearing face to assume a convex profile.

3. The bearing pad according to claim 2 wherein the width of such grooves decreases from said sidewalls of said leading and trailing edge portions toward said intermediate portion.

4. The bearing pad according to claim 3 wherein at least one of said grooves is filled with material having a lower coefficient of thermal expansion than the material forming the body of said bearing pad.

5. The bearing pad according to claim 4 wherein at least one of said grooves is filled with material having greater compressibility than said material forming said body of said bearing pad.

6. The bearing pad as claimed in claim 1 wherein:
   said bearing pad includes leading and trailing sidewalls defining leading and trailing edge portions of said pad with an intermediate portion formed therebetween; and
   said sidewalls having grooves formed therein such that said leading and trailing edge portions have zones of maximum compressibility adjacent respective said leading and trailing sidewalls with the stiffness of such leading and trailing edge portions increasing toward said intermediate portion, wherein oil pressure resulting from movement of a lubricated member over said bearing face causes deflection of said leading and trailing edge portions.

7. The bearing pad according to claim 6 wherein:
   each of said leading and trailing sidewalls includes at least one groove extending thereacross; and
   said grooves of said plurality of grooves in said leading and trailing sidewalls being of varying depths.

8. The bearing pad according to claim 6 wherein at least one of said grooves is filled with material having greater deformability and less stiffness than the material forming the body of said bearing pad.

9. The bearing pad according to claim 8 wherein at least one of said grooves is filled with material having a lower coefficient of thermal expansion than said body material of said bearing pad.

10. The bearing pad according to claim 9 wherein one of said grooves is filled with material having greater compressibility than said body material of said bearing pad.

11. In a bearing assembly having a first and second thrust member movable relative to each other including a plurality of bearing pads affixed to one of said thrust members and interposed between said thrust members, each bearing pad comprising:
    a base portion attached to one of said thrust members;
    a bearing surface disposed adjacent the other of said thrust members, said bearing surface being substantially planar in the unstressed condition and being thermoelastically deformable to assume a curved bearing surface, in operation, when thrust stresses are applied thereto;
    a lubricating film disposed between said bearing surface and said other thrust member, said lubricating film forming a hydrodynamic film when said other thrust member is moving over said bearing surface;
    said bearing pad further including leading and trailing edge portions and an intermediate portion formed therebetween, said intermediate portion having a different resultant coefficient of temperature expansion than said leading and trailing edge portions such that with increasing temperature said intermediate portion increases in thickness at a faster rate than said leading and trailing edge portions and projects toward said adjacent other thrust member so that a wedge shaped hydrodynamic lubricant film is defined between said bearing surface of said bearing pad and said adjacent other thrust member, said film being thicker at the leading edge portion than adjacent the intermediate portion; and
    a leading sidewall on said leading edge portion and a trailing sidewall on said trailing edge portion, said sidewalls having grooves formed therein such that said leading and trailing edge portions are more compressible than said intermediate portion and oil pressure of said hydrodynamic lubricant film causing deformation of said leading and trailing edge portions.

12. The bearing pad according to claim 11 wherein at least one of said grooves comprising cooling means for providing differential cooling of said intermediate portion and respective said edge portion.

13. A fixed thrust bearing pad for transmitting thrust loads between first and second thrust members moving relative to each other comprising:
    a base portion including means for uniformly supporting said bearing pad on one of said thrust members;
    a bearing face for engaging the other of said thrust members moving relative thereto with a hydrodynamic oil film disposed therebetween;

leading and trailing bearing pad edge portions and an intermediate portion formed therebetween, a leading sidewall on said leading edge portion;

groove means formed in said leading sidewall such that said leading edge portion is more compressible than said intermediate portion and oil pressure of said hydrodynamic lubricant film causing deformation of said leading edge portion; and said leading edge portion having a different coefficient of thermal expansion than said intermediate portion such that with increasing temperature, said intermediate portion increases in thickness at a faster rate than said leading edge portion, allowing formation of a wedge shaped hydrodynamic lubricant film between said other thrust member and said intermediate and leading edge portions.

14. The bearing pad according to claim 13, further comprising:
an oil conduit extending through said intermediate portion and oil supply means connected thereto for supplying lubricant at a predetermined pressure to the bearing pad surface for maintaining a hydrodynamic lubricant film.

15. In a bearing assembly having first and second thrust members movable relative to each other with a plurality of bearing pads interposed therebetween, each pad uniformly attached to one of said thrust members and comprising:

leading and trailing edge portions and an intermediate portion formed therebetween;

a base portion;

a bearing surface being thermoelastically deformable when thrust stresses are applied thereto through a lubricating film disposed between said bearing surface and the other of the thrust members;

a layer of material disposed between said base portion and said bearing surface such that said leading and trailing edge portions are more deformable than said intermediate portion and said intermediate portion has a different resultant coefficient of thermal expansion than the leading and trailing edge portions wherein with increasing operating temperatures said intermediate portion increases in thickness at a faster rate than said leading and trailing edge portions, said deformability and thermal expansion properties of said bearing pad allowing formation of a wedge shaped hydrodynamic lubricant film between said intermediate and leading edge portions and the adjacent other thrust member.

* * * * *